United States Patent [19]
Ashida et al.

[11] 3,832,036
[45] Aug. 27, 1974

[54] FILM FEED SYSTEM FOR A CONVERTIBLE MOTION PICTURE PROJECTOR

[75] Inventors: Akira Ashida; Tateo Yamada, both of Tokyo, Japan

[73] Assignee: Canon Kabushiki Kaisha, Tokyo, Japan

[22] Filed: June 28, 1973

[21] Appl. No.: 374,420

[30] Foreign Application Priority Data
July 6, 1972   Japan.............................. 47-67814

[52] U.S. Cl..................... 352/166, 226/34, 226/44, 352/128
[51] Int. Cl. ........................................... G03b 1/00
[58] Field of Search ........... 352/166, 180, 181, 157, 352/158, 159, 128; 226/34, 35, 44

[56] References Cited
UNITED STATES PATENTS

| | | | |
|---|---|---|---|
| 2,019,855 | 11/1935 | Hewitt .............................. | 226/34 X |
| 2,838,304 | 6/1958 | Berkenhoff .................... | 352/180 X |
| 3,218,115 | 11/1965 | Barocela ........................... | 352/158 |
| 3,362,600 | 1/1968 | Rietema ............................ | 226/35 |
| 3,704,820 | 12/1972 | Frederick ......................... | 226/34 |

*Primary Examiner*—Monroe H. Hayes
*Attorney, Agent, or Firm*—Flynn & Frishauf

[57] ABSTRACT

A motion picture projector is equipped to use both reel-to-reel film feed and endless film cartridges by providing a pivoted film guide arm in the cartridge arranged to press the film against a feed roller of the projector under control of film feed tension and arranging the projector so that the take-up reel drive for reel-to-reel operation can be converted to use as the aforesaid feed roller for endless film cartridge operation, by locking the take-up reel friction drive. This conversion may also include slipping an elastic roller over the take-up reel shaft.

5 Claims, 7 Drawing Figures

3,832,036

FILM FEED SYSTEM FOR A CONVERTIBLE MOTION PICTURE PROJECTOR

BACKGROUD OF THE INVENTION

1. Field of the Invention

The present invention relates to a feed device for motion picture film and other tape or ribbon materials.

2. Description of the Prior Art

Hitherto a specialized projector has been required for handling motion picture film in a magazine type endless reel. In these specialized equipments a system in which an endless reel is to be mounted has been adopted, and the large frictional resistance has necessitated pulling of film out of the reel by means of a forcible feed means such as sprocket wheel etc. tending to cause damage to the film.

SUMMARY OF THE INVENTION

It is the primary object of the present invention to provide a system which enables readily changing over from feeding of a motion picture film in endless form to feeding such a film by an ordinary reel to reel system.

It is another object of the present invention to provide a system which enables use of endless tape cartridges cooperatively using the pawl-operated film gate feed means together with an auxiliary film feed means regulated by a device in a cartridge support structure for always maintaining an appropriate extra length of film between the auxiliary film feed means and the film gate feed means.

It is a further object of the present invention to make dual use the take up reel shaft by providing on the conventional friction coupled reel shaft, means for locking the friction coupling so that the take-up reel shaft may double as the auxiliary film feed drive roller when an endless film cartridge is used.

DESCRIPTION OF PREFERRED EMBODIMENT

Figure 1:
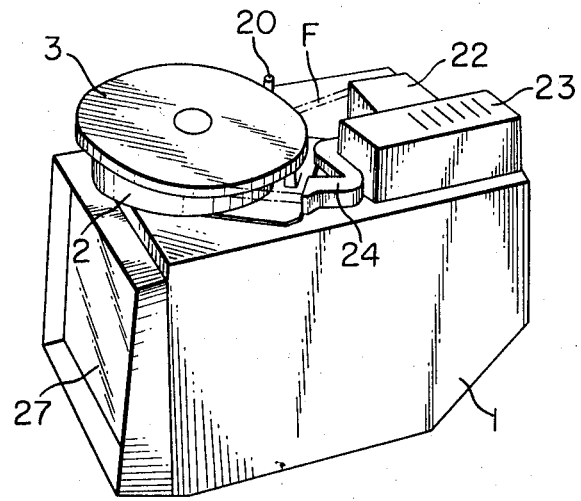
FIG. 1 is a perspective view of a projector loaded with an endless film cartridge in accordance with the present invention.
Figure 6:
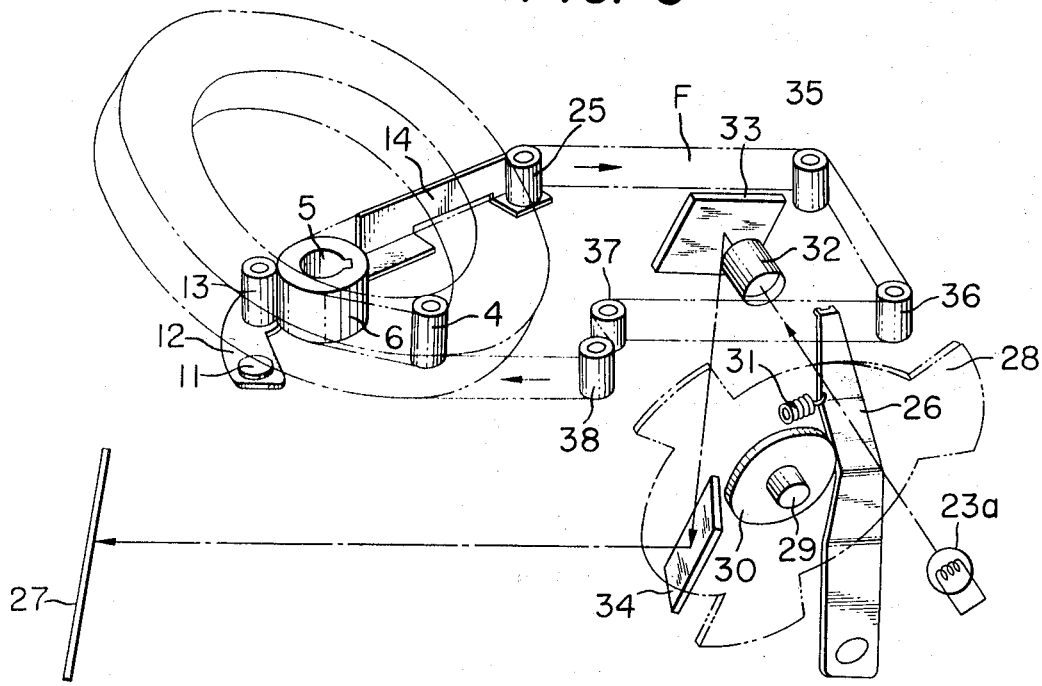
FIG. 6 is a diagrammatic perspective view of the disposition of the film guides and feeds and the optical system of the projector of FIG. 1.

FIG. 1 is a perspective view showing a projector body 1 and a table 2 on which is mounted an endless reel cartridge 3. The shaft 20 is provided for as a supply reel mounting shaft for use in reel to reel operation. FIG. 1 shows the projector, with an endless reel cartridge 3 mounted in the neighbourhood of take up reel shaft which is hidden by the table structure 2. A light source 23 of the projector includes a lamp 23a (FIG. 6). A housing 22 enclosed the film gate and its intermittent feed means provided with the usual feed pawl 26 shown in FIG. 6. A guide duct 24 is used for guiding the film which has passed through the film gate towards the a take up side of the cartridge.

Now with reference to FIGS. 2-6, FIG. 6 is a diagram showing the positional relation of light beam path of the light source 23a projected from the light source section 23 of the projector shown in FIG. 1, the film gate film feed means, the auxiliary film feed means described later, the film holding means, and the film loop detecting means. Reference numeral 28 indicates the shutter blade while 29 indicates the shutter shaft on which are fitted the shutter blade 28 and a cam 30. The feed pawl 26, is held constantly in contact with the cam 30 by a spring 31, and intermittently the film F, which is guided by rollers 35, 36, 37 and 38. A lamp 23a is disposed within the light source section 23 and projects light towards the film gate area. The light projected from the lamp 23a, after passing through the film present in the film gate, passes through the projection optical system 32, then after being reflected by mirrors 33 and 34 reaches a viewing screen 27 built into the projector body (FIG. 1) where the picture is displayed.

Figure 2:
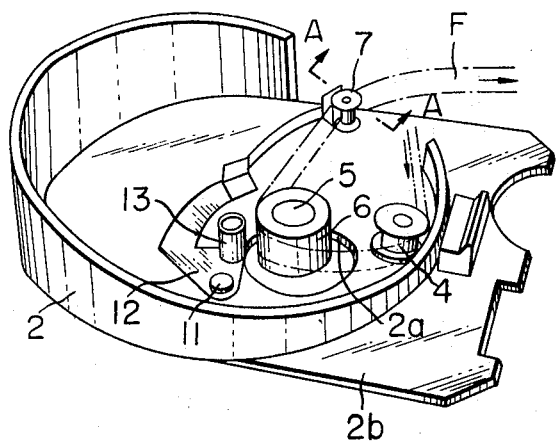
FIG. 2 is a perspective view of the cartridge table of FIG. 1 with the film storing part of the cartridge removed to show the interior of the carrier table.
Figure 3:
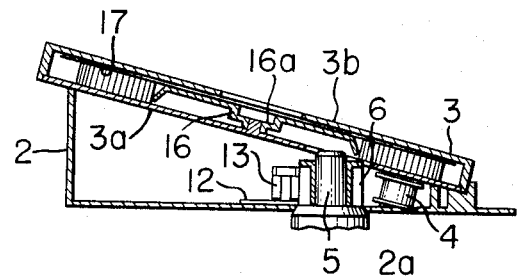
FIG. 3 is a cross-section of an endless film cartridge in position on the cartridge table of FIG. 2.

FIG. 3 is a sectional view of the endless reel cartridge 3 shown in FIG. 1 mounted on the cartridge table 2. FIG. 2 shows the internal structure of the endless reel cartridge table 2 that takes film off the endless film cartridge 3. In these diagrams 5 indicates a shaft serving both for driving the take up reel of the projector in reel to reel operation and also for driving the auxiliary feed for an endless film. The numeral 4 indicates a roller rotatably fitted between the reel bottom plate 3a and the bottom plate 2a of endless reel table 2, and the numeral 6 indicates a roller made of elastic material such as rubber etc. fitted to the shaft 5 in a detachable manner. A swinging lever 12 is pivoted on the stud 11 fixed on the bottom plate 2a of the reel table 2. The numeral 13 indicates a pinch roller rotatably mounted on the lever 12. The film F is held between the rubber roller 6 and the pinch roller 13 and thereby driven (see FIG. 6). The numeral 14 indicates a flexible extension fixed on the lever 12. Its flexibility provides a damping action. On the tip of this extension 14 a roller 25. The cross-sectional contour of this tip is shown in FIG. 5.

Figure 5:
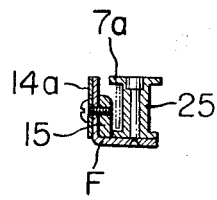
FIG. 5 is a sectional view along the line A-A of FIG. 2.

In FIG. 5, 14a indicates an L shaped tip portion of the flexible extension 14 to which a member 15 is fixed, by means of a set screw 21 in the direction orthogonal to the film travelling direction The member 15 is capable of coming into sliding contact with the film. In cooperation with the flange section 7a of roller 25 the member 15 can control the travelling position of the film and detect the amount of slack in the film. Reference number 16 indicates the endless film spool of the endless reel cartridge 3 and in the central upper half portion 16a of this spool there is provided a hole for an 8mm film projector reel conforming to the regular specifications, thereby making it possible to load endless film into the projector. A thin disc 17 is provided in the upper part of the film spool 16. By means of the disc 17 excessive drag from contact with the upper lid 3b of cartridge, which hinders the smooth film travel, can be prevented. The film is pulled out through an opening (not shown) provided in the bottom plate 3a into the space within the reel table 2. The disk 17 should be made of slick material or be provided with a slick coating.

Figure 4:
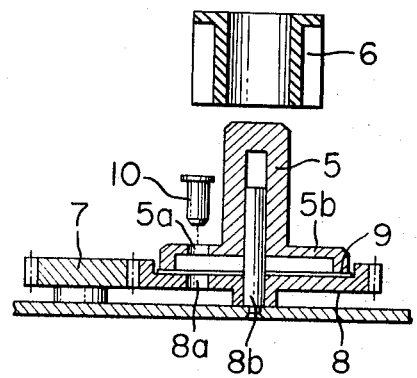
FIG. 4 is a detail sectional view of the convertible take-up drive and endless film feed roller part of which appears in FIGS. 2 and 3.

FIG. 4 is a sectional view showing in detail the structure of a take up shaft 5 of projector. In performing reel to reel film projection the take up shaft 5 transmits drive power from the well known drive motor provided in the projector body 1 through known transmitting means such as a belt, chain etc. to a gear 7 thereby causing a gear 8 engaged therewith to rotate.

Rotation of this gear 8 is transmitted to the friction-coupled take up shaft 5 by means of a friction plate 9. However for the purpose of projecting an endless film, the load applied to the shaft becomes heavy and film feeding by the feed pawl 26 alone of the projector film gate feed means is not adequate for proper film travel. Accordingly, a switch over from ordinary frictional coupling to integral coupling is made possible by providing an opening 8a between the shaft 8b and the edge of gear 8 and also providing another opening 5a in the flange 5b of the take-up shaft 5 at a position matching with the said opening 8a and inserting a pin 10 which penetrates both openings 5a and 8a. After thus locking together the members 5 and 8 with the pin 10, an elastic roller 6 is fitted on the take-up shaft 5 so that both of them can rotate as one body. The outside diameter of this roller 6 is so selected that the circumferential speed of the the periphery of roller is slightly faster than the film feeding speed.

Next, a description of the film feeding operation of a projector having the structure just described is given below. A portion of film on the innermost perimeter of the roll of film wound on the endless reel 3 is pulled out through an opening (not shown) and led into the space in the reel table 2. This portion of film, while slidingly contacting the circumferential surface of roller 4 as indicated by a dot-dash line in FIG. 2, comes into sliding contact with the outer circumferential surface of the elastic roller 6 mounted on the take up shaft 5 projecting through the opening 2a of reel table bottom plate 2b into the reel table 2, then advances past the roller 7 to the feed pawl 26 of the film feed means 23 of the projector 1. The film fed by the feed pawl 26 passes back through the film duct 24 to be wound on the outermost circumference of the endless film roll in the endless film cartridge 3.

In projecting an ordinary film from reel to reel the take up shaft 5 makes slidable coupling with gears 7 and 8 through the friction plate 9. For projecting an endless film, however, because the load of film feeding becomes heavier the feed pawl 26 alone is insufficient for film feeding, as mentioned before. For operation with endless film cartridges the take up shaft 5 and feed gear 8 are therefore integrally coupled together with a pin 10, and also an elastic roller 6 is mounted on the shaft 5 to cause the film F to travel along the peripheral surface of the roller 6. The pinch roller 13 provided on the lever 12 which swings freely on the pivot 11 presses the film against the surface of the elastic roller 6 A roller 25 attached to the tip of the flexible member 14 is provided on the lever 12 so that when the length of film loop between the elastic roller 6 and the film feed pawl 26 becomes small, tension of the film in contact with the roller 25 causing the movable lever 12 to rotate clockwise (in FIG. 2) about the shaft 11 as a fulcrum, and the pinch roller 13 is displaced in such a direction as to hold the film more tightly against the rubber roller 6. With maximum pressure the film travels at a speed approximately the same as the circumferential speed of the rubber roller 6, increasing the slack in the film loop. Conversely, when the length of film loop between the roller 6 and the feed pawl 26 is long, the stiffness of the film itself pushes the member 15 (FIG. 5) by sliding contact in the direction away from the roller 25 and causes the lever 12 to rotate counterclockwise (in FIG. 2) and either stops the pinch roller 13 from pressing the film F into contact with the roller 6 or causes reduction in the pressure contact force. Accordingly, the film F slips between the elastic roller 6 and the pinch roller 13, slowing down the film pull-out speed produced by the roller 6, This condition is maintained until the film length between the roller 6 and the feed pawl 26 returns to normal. The flexible extension member 14 participates in the action described above and has a construction which in cooperation with the flange section 7a of the roller 25 makes it easy to lead the film into the gap between the member 15 and the roller 25 and difficult for the film to come out of place accidentally.

Figure 7:
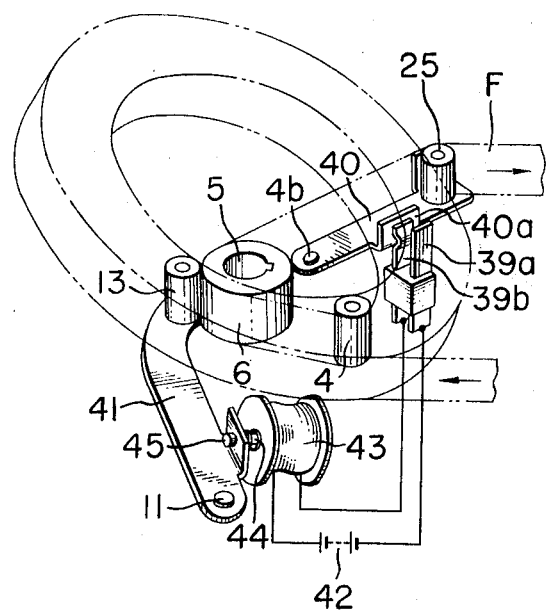
FIG. 7 is a diagrammatic perspective view of a modified form of the film length of the cartridge table of a projector according to the invention.

FIG. 7 is another embodiment of means for detecting the amount of slack between the roller 6 and the intermittent and second film feed of the film gate The device of FIG. 7 has an electric film slack detecting means. In the diagram, 41 is a member pivoted on the stud 11 and the member 41 is provided with a pinch roller 13 which is able to provide pressure contact against the peripheral surface of the elastic roller 6 and also is connected to the excitation magnet 43 by means of a shaft 45 and a spring 44. 40 is a lever pivoted on the stud 4b. It has a bent section 40a, and a roller 25 is provided at the tip of the lever 40. A switch 39 is provided for exciting the magnet 43 by rotating and displacing the shaking member 40 clockwise causing terminals 39 and 39b to make contact when the film length between the first and second film feed means becomes small. 42 indicates the power source.

When the magnet 43 is excited, the movable member 41 is rotated and displaced clockwise in FIG. 7 with the stud 11 as a fulcrum and the pinch roller 13 moves in the direction to hold the film F against the roller 6, thus maintaining a normal amount of slack in the film.

The present invention provides a film feed system for a motion picture projector that is readily convertible from reel-to-reel operation to endless film operation. The cartridge table 2 is made as part of the cartridge. Only the locking of the friction coupling of the take-up drive and, if desired, the provision of the elastic roller surface 6, are necessary for the conversion of the projector to endless film operation and the conversion back to reel-to-reel operation is equally simple.

We claim:

1. A film feed system for an endless film cartridge loaded in a motion picture projector which is equipped to use reel-to-reel film feed as well as to operate with an endless film cartridge, comprising:

a motion picture projector including
a drive motor;
film feeding means arranged along a film feed path of said projector and including means provided with a film feeding pawl for intermittently advancing film through a film gate;
rotary drive means driven by said motor;
rotary means arranged to receive driving force from said rotary drive means through friction coupling means and located so as to be capable of functioning as the take-up reel drive of said projector in reel-to-reel operation;

locking means for selectively locking and unlocking said rotary means with said rotary drive means, and additional shaft means for accomodating and operating a film supply reel in reel-to-reel operation, and a film cartridge containing an endless film except for an external loop thereof and including a film accommodating portion for storing the endless film and means for carrying said film accommodating portion and fitting on said projector in a position enclosing said rotary drive means without contact therewith, but not enclosing said additional shaft means, said carrying means including pivoted lever means provided with guide means for said loop of said endless film at an end of said lever means and provided also with film urging means movable between an engaging position and a disengaging position with said rotary drive means, in response to pivotal movement of said lever means, said pivoted lever means being arranged for pressing said film urging means against said rotary drive means when the slack of the film between said film feeding means and said rotary drive means is reduced, thereby maintaining the film slack therebetween at a predetermined value.

2. A film feed system according to claim 1, wherein said film urging means includes a rotatable pinch roller.

3. A film feed system according to claim 1, wherein said rotary drive means includes a removable friction roller surface member.

4. A film feed system according to claim 1, wherein said guide means includes a rotatable roller.

5. A film feed system according to claim 1, further comprising:

an excitation magnet disposed in the vicinity of said pivoted lever means to control said film urging means engageable with said second rotary drive means;

switching means actuatable in response to said pivoted lever means to control said excitation magnet.

* * * * *